US010239438B2

(12) United States Patent
Bederke et al.

(10) Patent No.: US 10,239,438 B2
(45) Date of Patent: Mar. 26, 2019

(54) DEVICE FOR LASHING OF CONTAINERS

(71) Applicant: SEC Ship's Equipment Centre Bremen GmbH & Co., KG, Bremen (DE)

(72) Inventors: Christian Bederke, Bremen (DE); Darius Kosznik, Bremen (DE); Wolfgang Thiele, Bremen (DE)

(73) Assignee: SEC Ship's Equipment Centre Bremen GmbH & Co. KG, Bremen (DE)

( * ) Notice: Subject to any disclaimer, the term of this patent is extended or adjusted under 35 U.S.C. 154(b) by 115 days.

(21) Appl. No.: 15/115,630

(22) PCT Filed: Mar. 24, 2015

(86) PCT No.: PCT/EP2015/056184
§ 371 (c)(1),
(2) Date: Jul. 29, 2016

(87) PCT Pub. No.: WO2015/144659
PCT Pub. Date: Oct. 1, 2015

(65) Prior Publication Data
US 2017/0129382 A1 May 11, 2017

(30) Foreign Application Priority Data
Mar. 25, 2014 (DE) .................. 10 2014 104 104

(51) Int. Cl.
*B60P 7/08* (2006.01)
*F16G 11/12* (2006.01)

(52) U.S. Cl.
CPC .............. *B60P 7/083* (2013.01); *F16G 11/12* (2013.01)

(58) Field of Classification Search
CPC ............. Y10T 403/591; Y10T 403/592; Y10T 403/598; Y10T 403/599; B60P 7/083; F16G 11/12
(Continued)

(56) References Cited

U.S. PATENT DOCUMENTS 3,751,083 A * 8/1973 Jacobson .................. F16B 7/06
254/100
4,130,269 A * 12/1978 Schreyer ................. F16G 11/12
24/19
(Continued)

FOREIGN PATENT DOCUMENTS

DE 10056341 A1 7/2002
DE 102008011769 A1 * 9/2009 .............. F16G 11/12
(Continued)

OTHER PUBLICATIONS

Korean Patent Office, Office Action, Device for the Lashing of Containers, dated Jan. 24, 2018, Korea.
(Continued)

*Primary Examiner* — Amber R Anderson
*Assistant Examiner* — Nahid Amiri
(74) *Attorney, Agent, or Firm* — Schmeiser, Olsen & Watts LLP

(57) ABSTRACT

The present invention relates to a device for the lashing of containers, which is to be attached between two fastening points, which are secured to one another, with a first clamping device, which can be connected to one of the fastening points and contains a spindle, which extends in the longitudinal direction of the first clamping device and has a spindle/threaded section, a second clamping device, which can be connected to the other of the fastening points, a spindle nut, which has a spindle nut/threaded section, which engages with the spindle/threaded section of the first clamp-
(Continued)

ing device, a locking means allocated to the spindle nut. The locking means enables reciprocal rotation of the two clamping devices in at least one direction of rotation corresponding to the tightening of the device, and that it counters the rotation in the opposite direction, and the locking means has at least one pre-tensioning element.

4 Claims, 5 Drawing Sheets

(58) Field of Classification Search
USPC .......... 403/322.1, 322.2, 598, 599, 324, 325
See application file for complete search history.

(56) References Cited

U.S. PATENT DOCUMENTS

| | | | | |
|---|---|---|---|---|
| 4,408,925 A * | 10/1983 | Louie | ...................... | F16G 11/12 403/27 |
| 4,973,185 A * | 11/1990 | Thaller | .................. | F16G 11/12 403/11 |
| 6,161,981 A * | 12/2000 | Dehlin | ..................... | F16B 7/06 403/43 |
| 6,945,516 B1 * | 9/2005 | Scott | ....................... | B60P 7/083 254/231 |
| 7,552,913 B1 * | 6/2009 | Amoss | .................... | F16G 11/12 254/233 |
| 7,575,403 B2 | 8/2009 | Hsieh | | |
| 2002/0164205 A1 * | 11/2002 | Kresge | ................... | F16D 1/112 403/322.1 |
| 2008/0012360 A1 * | 1/2008 | Engel | ................. | E05B 15/0053 292/252 |
| 2011/0056057 A1 * | 3/2011 | Lin | ........................ | F16G 11/12 24/68 D |
| 2011/0253956 A1 * | 10/2011 | Smetz | ..................... | F16G 3/006 254/100 |
| 2012/0201597 A1 * | 8/2012 | Comerford | ............ | E04C 5/165 403/306 |
| 2013/0140124 A1 * | 6/2013 | Mitchell | ................ | B60P 7/083 192/43.1 |
| 2014/0326935 A1 * | 11/2014 | Chao | ....................... | B60P 7/083 254/235 |
| 2015/0060629 A1 * | 3/2015 | Schmier, II | ............ | F16B 2/065 248/499 |
| 2016/0265623 A1 * | 9/2016 | Kingery | .................. | F16G 11/12 |

FOREIGN PATENT DOCUMENTS

| | | | | |
|---|---|---|---|---|
| DE | 202011051136 U1 | | 1/2012 | |
| DE | 202011050018 U1 | | 9/2012 | |
| DE | 202011050499 U1 * | | 9/2012 | ............. B60P 7/083 |
| DE | 202012100883 U1 * | | 6/2013 | ............. B60P 7/083 |
| EP | 2471686 A1 * | | 7/2012 | ............. B60P 7/083 |
| JP | 5053565 | | 5/1975 | |
| JP | 1189017 | | 10/1976 | |
| JP | 200707813 | | 3/2007 | |
| WO | 2006046921 A1 | | 5/2006 | |

OTHER PUBLICATIONS

Bederke, Christian, Device for Lashing of Containers, PCT Serial No. PCT/EP2015/056184, International Search Report, dated Jun. 16, 2015.

* cited by examiner

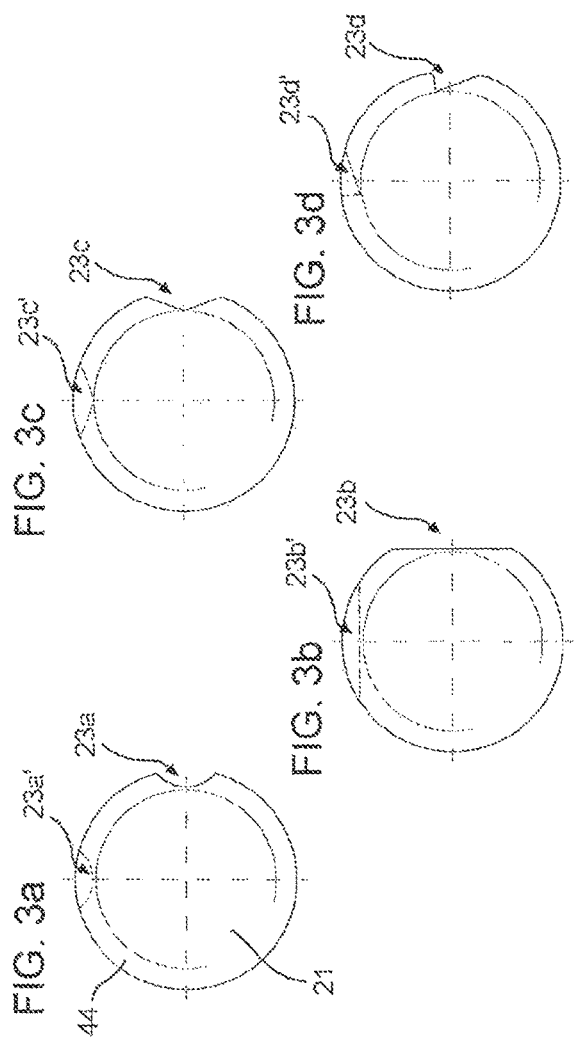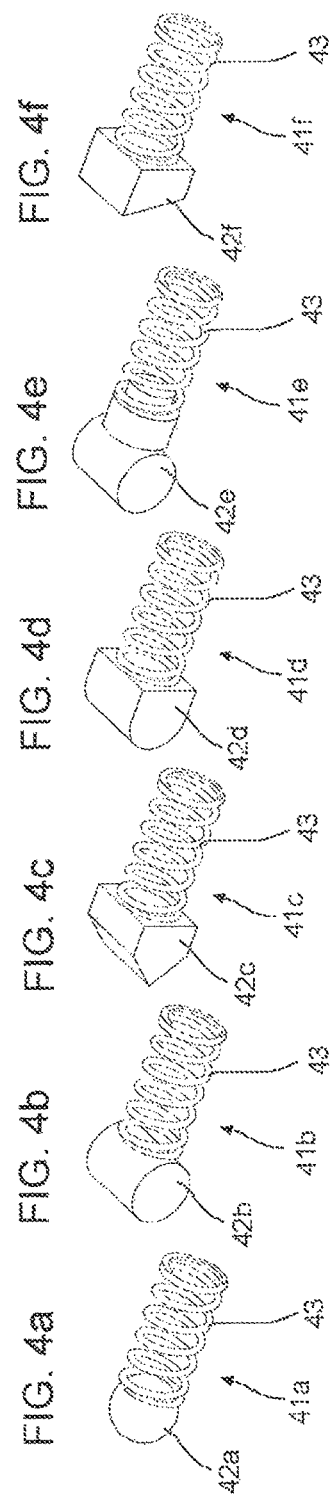

DEVICE FOR LASHING OF CONTAINERS

The present invention relates to a device for the lashing of containers, which is to be attached between two fastening points, which are to be secured to one another, with a first clamping device, which can be connected to one of the fastening points and contains a spindle, which extends in the longitudinal direction of the first clamping device and has a spindle/threaded section, a second clamping device, which can be connected to the other of the fastening points, a spindle nut, which has a spindle nut/threaded section, which engages with the spindle/threaded section of the first clamping device, and a locking means allocated to the spindle nut, wherein the spindle nut is arranged between the first and the second clamping device.

PRIOR ART

Such a device is known from DE 100 56 341 A1 or from EP 1 534 584 B1. Lashing devices with a clamping element are described therein having a threaded spindle, a spindle nut engaged therewith, and a locking means allocated to the spindle nut, wherein the locking means contains a locking bolt, which can be radially affixed to the threaded spindle.

For such types of devices, a disadvantage is that the securing takes a certain amount of time until the locking bolt has been screwed together with the threaded spindle using friction and/or positive locking. It likewise takes a correspondingly long time until the locking bolt is unscrewed when detaching the lashing. Furthermore, it is possible that tightening the locking bolt will be forgotten. In such a case, the device will no longer be protected against becoming loose.

In order to prevent these problems, WO 2006/046921 A1 proposes a lashing device with a self-locking means. The lashing device in WO 2006/046921 A1 consists of a clamping device, which is to be attached between two fastening points, which are to be secured to one another. The clamping device may consist of clamping device parts, each of which may connect to one of the fastening points. Of the clamping device parts, at least one first clamping device part has an expansion rod, which extends in the longitudinal direction of the clamping device, and a threaded section. A second clamping device part in this case supports a bushing part, which is to be screwed onto the thread of the first clamping device part. A connecting part is arranged between the first and the second clamping device part, which enables the reciprocal rotation of the two clamping device parts, by means of a snap-on fastener, in at least one direction of rotation corresponding to the tightening of the clamping device, and which counters the rotation in the opposite direction.

The lashing device disclosed in WO 2006/046921 A1, including the connecting part sliding on the expansion rod and/or the clamping device parts, has the advantage that both the lashing and the securing can be fulfilled in a time-saving manner and cannot be forgotten. The disadvantage however is that the connecting part required for the lashing is only loosely arranged between the expansion rod and the clamping device parts. This results in the risk that the connecting part could slip from the end area of the expansion rod in the event of vibrations and the like and/or a horizontal lashing in which a low or no inherent weight is acting on the connecting part. In order to solve this problem, WO 2006/046921 A1 proposes retaining the connecting part in such situations via an additional securing means.

The underlying problem upon which the present invention is based is thus to provide a device of the aforementioned type that can be quickly, easily, and securely mounted in any situation using the least amount of components possible, without additional securing means.

BRIEF SUMMARY OF THE INVENTION

The problems are solved with a device of the aforementioned type in that the locking means is designed such that it enables reciprocal rotation of the two clamping devices in at least one direction of rotation corresponding to the tightening of the device, and the rotation counters in the opposite direction, and the locking means has at least one pre-tensioning element, which acts upon the spindle by means of a spring force.

With the device according to the invention, no locking nut consequently has to be laboriously screwed onto the spindle or the threaded section of the spindle against the spindle nut, nor does a locking bolt of a locking means have to be screwed additionally onto the threaded section. This results in a reliable and easy-to-operate lashing device that is effective without an additional securing process by, for example, a longshoreman on board of a ship and that cannot be forgotten. Furthermore, the device according to the invention can be quickly and reliably used with both horizontal and vertical lashing without limitations or additionally required components.

Advantageous further embodiments of the device according to the invention for the lashing of containers are the subject matter of dependent claims 2 to 4.

Thus, with a preferred embodiment of the present invention, the at least one pre-tensioning element consists of a spring and a head element, wherein the head element is essentially shaped as a sphere, hemisphere, cylinder, wedge, or sawtooth. Therefore, various pre-tension elements are conceivable that enable an especially advantageous securing of the same depending on the qualities of the spindle. When the head element is in the shape of a sawtooth, a surface facing toward the spindle/threaded section, when viewed from the radial direction of the spindle for example, is pointier than the other surface facing toward the spindle thread. Put more precisely, the surface pointing in the direction of the lashing in the wedge-shaped head element forms a pointier angle than the surface of the head element pointing against the lashing direction. With such type of embodiment, not only a particularly effective securing of the spindle is possible, but rather the spindle nut can also be rotated onto the spindle with a pre-tensioning element resting on the spindle even with relatively low friction resistance.

Furthermore, the spindle contains at least one non-threaded section extending in the longitudinal direction of same, which interrupts the threaded section in the circumferential direction according to a preferred embodiment. This makes the securing of the spindle particularly simple. In a preferred further embodiment, the spindle has two non-threaded sections, which are offset by 90° in the circumferential direction of the spindle, and the spindle nut has two pre-tensioning elements, which are offset by 180° in the circumferential direction of the spindle nut. With such type of further embodiment, an effective securing of the spindle is enabled, because four positions of engagement offset by 90° can be obtained between the two non-threaded sections and the two pre-tensioning elements. The non-threaded section in this case can be a groove or a flattening.

According to the present invention, an embodiment in which the spindle nut is an integral component of the second clamping device is also conceivable. In this case, the number of required parts is reduced.

DESCRIPTION OF FIGURES

Preferred exemplary embodiments of the device according to the invention are explained in greater detail in the following on the basis of the drawings. The drawings show the following:

FIG. 3a, FIG. 3b, FIG. 3c, and FIG. 3d show spindle/threaded sections with alternative non-threaded sections for devices with the features of the invention;

FIG. 4a, FIG. 4b, FIG. 4c, FIG. 4d, FIG. 4e, and FIG. 4f show alternative pre-tensioning elements for devices with the features of the invention;

EXEMPLARY EMBODIMENTS

Figure 1:
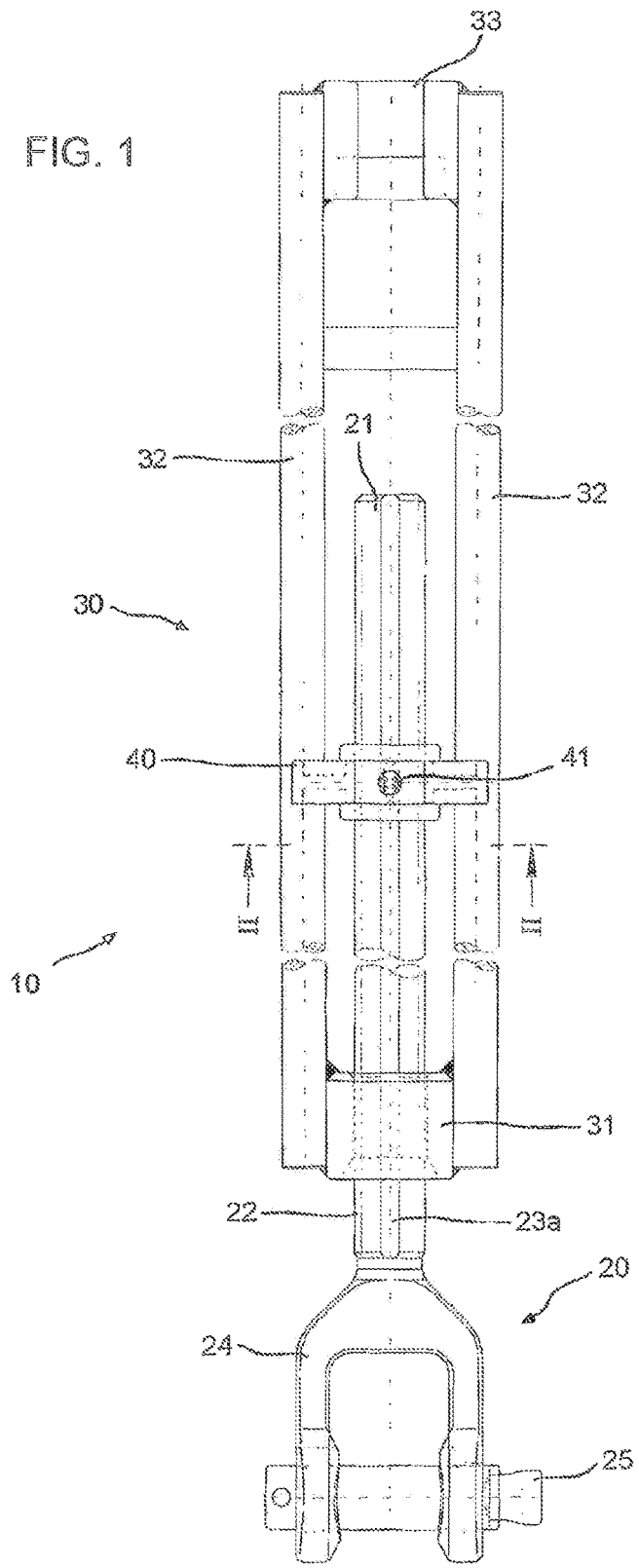
FIG. 1 shows a first embodiment of a device for the lashing of containers with the features of the invention in a top view.

FIG. 1 shows a device 10 for the lashing of a container, which is not shown, particularly a container on deck of a ship. The device 10 has a first clamping device 20, a second clamping device 30, a spindle 21, and a spindle nut 40. The first clamping device 20 is formed essentially in the shape of a fork. The second clamping device 30 has a clamping device guide 31 at its end and a bearing 33 some distance away. The clamping device guide 31 and the bearing 33 are connected to one another by means of two struts 32. The first clamping device 20 has a clevis 24 with a locking pin 25 at the end of the spindle 21 facing away from the bearing 33 and thus forms a shackle at its end. Instead of the locking pin 24, a threaded screw, for example, can also be used.

Figure 2:
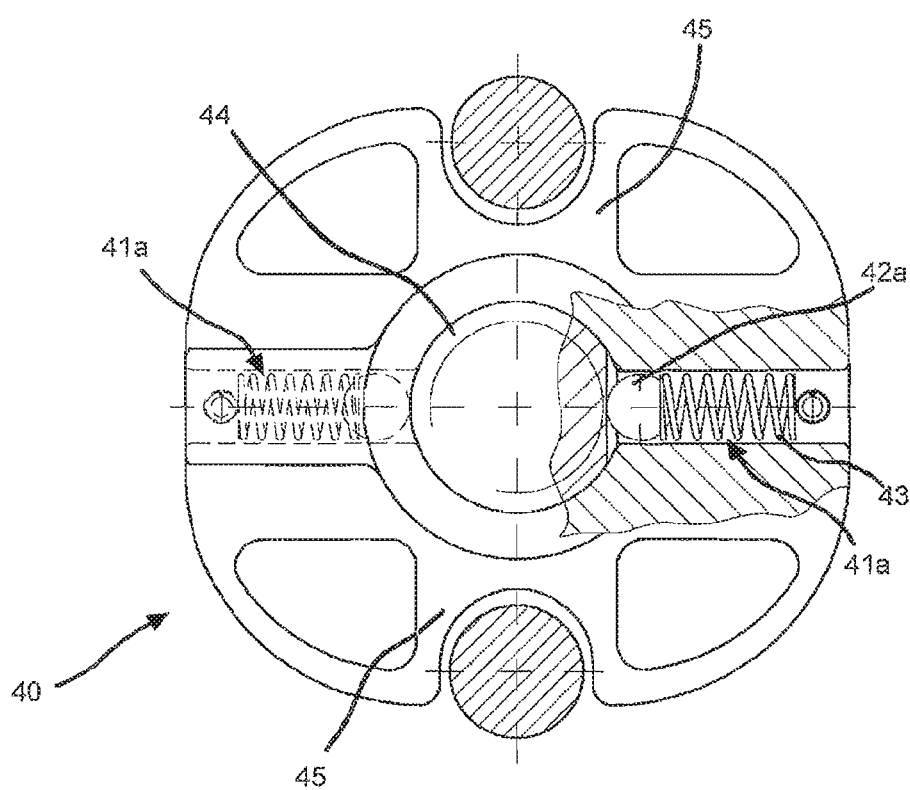
FIG. 2 shows the device according to FIG. 1 in a cross-section in the planes II-II.

FIG. 2 shows a sectional view of the device according to FIG. 1. The spindle nut 40 has a spindle nut guide 45 it uses to secure against twisting around the first clamping device 20 and the second clamping device 30 around its longitudinal axis and in the longitudinal axis of which it can be slid on guides. The spindle nut guides 45 in this case interact with the struts 32 of the second clamping device 30. Furthermore, the spindle nut 40 has an inner thread 44 (spindle nut/threaded section), which engages with the outer thread 22 of the spindle 21 (spindle/threaded section). The spindle nut 40 furthermore has a locking means 41 allocated to it, which enables reciprocal rotation of the two clamping devices 20, 30 in at least one direction of rotation corresponding to the tightening of the device 10, and which counters the rotation in the opposite direction. Put more precisely, the locking means 41 according to the present embodiment has two pre-tensioning elements 41a, which act upon the spindle 21 by means of the force from a spring 43. According to the embodiment shown in FIG. 2, the two pre-tensioning elements 41a each consist of the spring 43 and a corresponding head element 42a, wherein the head element 42a in the present case is formed in the shape of a sphere.

When lashing a container with the device shown in FIG. 1 and FIG. 2, initially a lashing rod or a lashing rope, which is not shown, is suspended at an upper corner fitting of a container, which is not shown. The other end of the lashing rod is suspended in the bearing 33. The clevis 24 is routed over a lashing eyelet, which is not shown, and attached to said eyelet using the locking pin 25. This embodiment is also possible in the reversed configuration. The spindle nut 40 has an inner thread 44 corresponding to the outer thread 22 of the spindle 21. The spindle nut 40 can additionally be moved in the longitudinal direction of the second clamping device 30 on it. By rotating the second clamping device 30 around its longitudinal axis, the spindle nut 40 is screwed onto the spindle 21 of the first clamping device 20, wherein the spindle nut 40 is also carried along with it due to the spindle nut guide 45 interacting with the struts 32. The container is thereby lashed down. As soon as the desired clamping force of the device is achieved for lashing the container, and, for example, the longshoreman operating the device is no longer exerting force onto the device 10, the locking means 41 and/or the two pre-tensioning elements 41a act upon the spindle 21 by means of the force of the spring 43 such that it counters a reciprocal rotation of the two clamping devices 20, 30 at least in one direction of rotation that corresponds to the detachment of the device 10.

One of the sphere-shaped head elements 42a of the pre-tensioning elements 41a in this case engages, in order to secure the spindle 21, preferably in a non-threaded section 23a extending in the longitudinal direction of same, which interrupts the spindle/threaded section 22 in the circumferential direction, and, as shown in FIG. 2, is formed in the shape of a groove. The non-threaded section of the spindle 21 and the one head element 42a of the one pre-tensioning element 41a in this case are preferably at least partially in positive locking engagement. The other head element 42a of the other pre-tensioning element 41a in this case rests at the spindle threaded section 22 at least through friction locking. Through such type of embodiment, the spindle 21 can be particularly easily and effectively secured.

Although the non-threaded section in FIG. 2 is shown in the shape of a circular segment, it is not limited to this. Alternatively, the non-threaded section may have different groove shapes. For example, the non-threaded section, as shown in FIGS. 3a to 3d, may be formed also as a straight or flattened non-threaded section 23b, 23b', as a V-shaped groove 23c, 23c', or as a sawtooth-shaped groove 23d, 23d'. Instead of the circular segment groove shape, an elliptical groove (not shown), for example, is also conceivable. FIGS. 3a to 3d each show two non-threaded sections, wherein a non-threaded section that is represented with dashed lines and designated with ' is optional. The size of the non-threaded section on the spindle may vary depending on need. The ratio between the spindle/threaded section 22 and the non-threaded section can be configured depending on the tensile and compressive loading of the device 10.

Furthermore, the head element 42a does not necessarily have to be formed as rotationally symmetrical even though it is represented in FIG. 2 in the shape of a sphere. As shown perspectively in FIGS. 4a to 4f, the head element 42 may be designed in the shape of a cylinder, wedge, circular segment, or sawtooth. As an alternative to the wedge-shaped head element 42, an egg-shaped head element, which is not shown here, is also conceivable. It is preferable, in any case, for the head element 42 to have a corresponding shape for the groove or flattening 23. When selecting the head element for the device 10, it should be noted that it can be suitably brought into friction locking and/or positive locking with the corresponding non-threaded section. Basically, the combination comprising at least one non-threaded section 23 in at least one head section 42 is freely selectable however.

In order to have the least possible resistance from the pre-tensioning elements when detaching the device 10, it is conceivable in an exemplary embodiment, which is not shown, for the spring 43 and/or the head element 42 to be attached to a reset mechanism, for example a cord, a pin, or the like. When detaching the device 10, the pre-tensioning element can then be placed into a position by the longshoreman, for example, and stopped in this position optionally in which the head element 42 is not resting at the spindle 21.

Although the spindle 21 in the figures is always shown with at least one non-threaded section, the spindle 21 may also be formed without a non-threaded section. In an especially preferred further embodiment, the spindle 21, as shown in FIG. 3a for example, has two non-threaded sections 23a, 23a', which are offset by 90° in the circumferential direction of the spindle 21, and the spindle nut 40, as shown in FIG. 2 for example, has two pre-tensioning elements 41a, which are offset by 180° in the circumferential direction of the spindle nut 40. With such type of a further embodiment, an effective securing of the spindle 21 is enabled, because four positions of engagement offset by 90° can be obtained between the two non-threaded sections 23a, 23a' and the two pre-tensioning elements 41a. As an alternative, an embodiment is also possible in which the non-threaded sections 23a, 23a' are offset by 180° and the pre-tensioning elements 41a are offset by 90°. In general, the number of these engagement positions can be expanded as desired through additional pre-tensioning elements and/or non-threaded sections depending on the configuration of the device 10.

Furthermore, it should be mentioned that although the head element in the figures is pretensioned exclusively by a helical compression spring, the head element may also be pretensioned, for example, as well by a torsion spring, a flexible spring, an air spring, an elastomer spring, an evolute spring, or another resilient pre-tensioning element known in the prior art. In doing so, a separate head element is not necessarily required. In an alternative exemplary embodiment, the spring 43 may itself also form the suitable head element.

Figure 5:
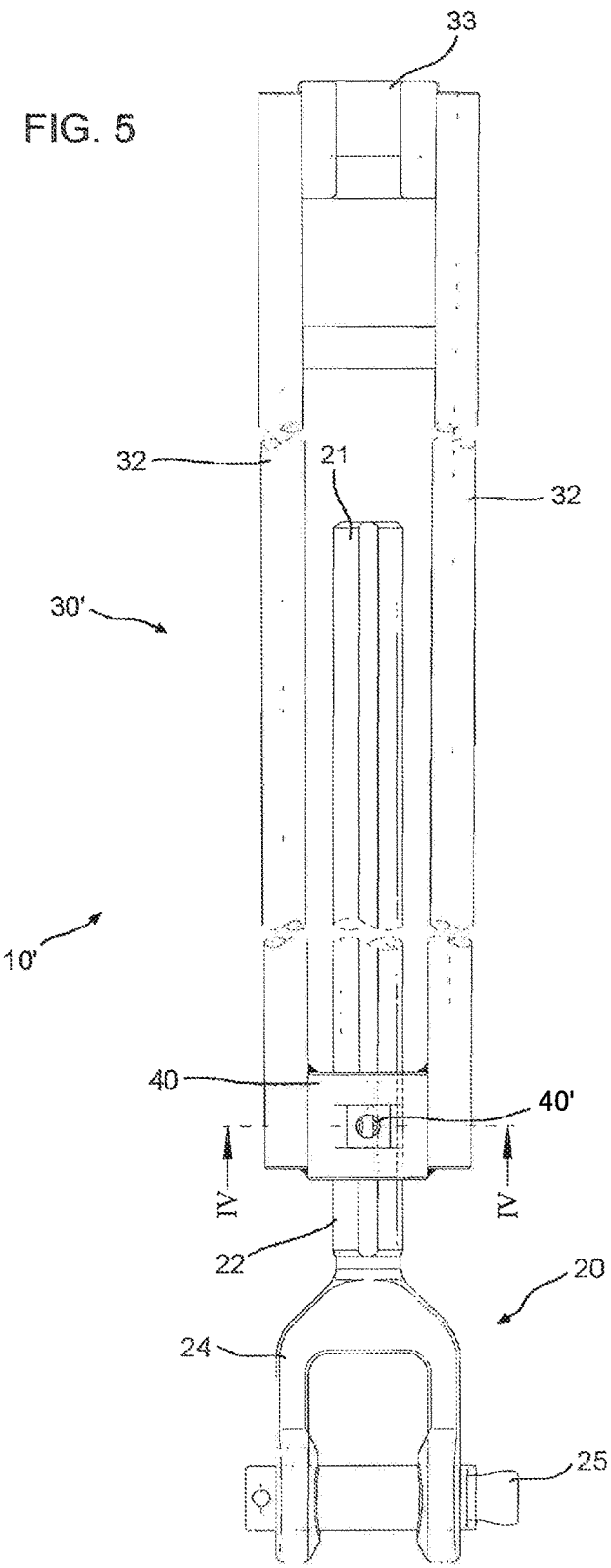
FIG. 5 shows a further embodiment of a device for the lashing of containers with the features of the invention in a top view.

FIG. 5 shows a device 10' as a second embodiment of the present invention. The device 10' has a fork-shaped first clamping device 20, which is essentially the same as the clamping device of the first embodiment. The device 10' further has a second clamping device 30', which is similar to the first embodiment; however, it has spindle nut 40' integrated at an end facing toward the clevis 24 of the first clamping device 20. The spindle nut 40' is firmly connected to the struts 32. With the exemplary embodiment shown, the spindle nut 40' is welded to the struts 32. The number of components necessary for the device 10' can thereby be reduced. The spindle nut 40' integrated into the second clamping device 30' according to the second embodiment in this case is essentially the same as the separately provided spindle nut 40 according to the first embodiment.

Figure 6:
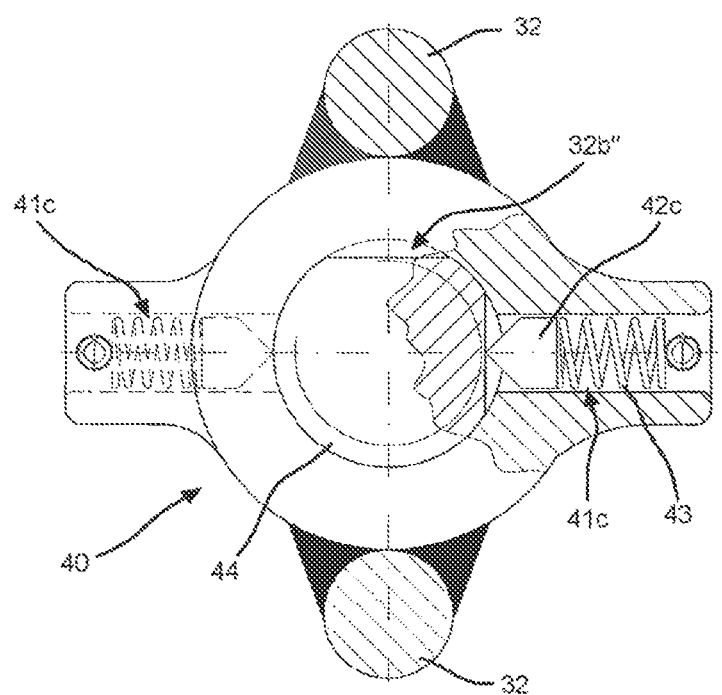
FIG. 6 shows the device according to FIG. 5 in a cross-section in the planes

FIG. 6 shows a sectional view of the device 10' of FIG. 5, in which, on the spindle 21, a straight, non-threaded section 23b" is provided, for example, onto which a wedge-shaped head element 42c is being pressed via the spring 43.

REFERENCE LIST 10, 10' Device
20 First clamping device
21 Spindle
22 Spindle/threaded section
23 Non-threaded section (23a, 23a', 23b, 23b', 23b", 23c, 23c', 23d, 23d')
24 Clevis
25 Locking pin
30, 30' Second clamping device
31 Clamping device guide
32 Struts
33 Bearing
40, 40' Spindle nut
41 Locking means (pre-tensioning element 41a, 41b, 41c, 41d, 41e)
42 Head element (42a, 42b, 42c, 42d, 42e, 42f)
43 Spring
44 Spindle nut/threaded section
45 Spindle nut guide

What is claimed is:

1. A container lashing device (10; 10'), which is to be attached between two fastening points, which are to be secured to one another, the container lashing device (10; 10') comprising:
   a first clamping device (20), having a first fastening means (24) to be connected to one of the fastening points and a spindle (21), which extends in the longitudinal direction of the first clamping device (20) and has a spindle/threaded section (22);
   a second clamping device (30; 30'), having a second fastening means (33) to be connected to the other of the fastening points;
   a spindle nut (40; 40'), having a spindle nut/threaded section (44), which engages with the spindle/threaded section (22) of the first clamping device (20), and which is arranged between the first and the second clamping device (20, 30; 20, 30'); and
   a locking means (41) allocated to the spindle nut (40; 40'), which enables reciprocal rotation of the two clamping devices (20, 30; 20, 30') in at least one direction of rotation corresponding to the tightening of the device (10; 10'), and which counters the rotation in the opposite direction, and which has at least one pre-tensioning element (41a; 41b; 41c; 41d; 41e), which acts upon the spindle (21) by means of a spring force;
   wherein the spindle (21) contains at least one non-threaded section in the form of a circular groove (23a, 23a'), a V-shaped groove (23c, 23c'), or elliptical groove, or a flattening (23b, 23b') extending in the longitudinal direction of same, which interrupts the spindle/threaded section (22) in the circumferential direction; and
   wherein the at least one pre-tensioning element consists of a head element (42a; 42b; 42c; 42d; 42e; 42f) in the shape of a sphere, hemisphere, cylinder, or wedge and a spring (43) forcing the head element (42a; 42b; 42c; 42d; 42e; 42f) toward the spindle/threaded section (22).

2. The container lashing device (10; 10') according to claim 1, wherein the spindle (21) has two non-threaded sections (23a, 23a'; 23b, 23b; 23b, 23b"; 23c, 23c; 23d, 23d'), which are offset by 90° in the circumferential direction of the spindle, and the spindle nut (40) has two pre-tensioning elements (41a; 41b; 41c; 41d; 41e), which are offset by 180° in the circumferential direction of the spindle nut (40; 40').

3. The container lashing device (10; 10') according to claim 1, wherein the spindle nut (40') is an integral component of the second clamping device (30).

4. The container lashing device (10; 10') according to claim 1, wherein the groove (23*a*, 23*a'*; 23*c*, 23*c'*) or flattening (23*b*, 23*b'*) is symmetric to the radial direction of the spindle (21).

\* \* \* \* \*